United States Patent [19]

Kano et al.

[11] Patent Number: 5,407,706
[45] Date of Patent: Apr. 18, 1995

[54] RESIN COMPOSITION FOR POWDER COATINGS

[75] Inventors: Taisaku Kano, Yokohama; Takayoshi Sekido, Hiratsuka; Eiichiro Miyazaki, Fujisawa; Makoto Nishimori, Yokohama, all of Japan

[73] Assignee: Mitsui Toatsu Chemicals, Inc., Tokyo, Japan

[21] Appl. No.: 999,655

[22] Filed: Dec. 29, 1992

Related U.S. Application Data

[63] Continuation of Ser. No. 674,467, Mar. 25, 1991, abandoned.

[30] Foreign Application Priority Data

Oct. 12, 1990 [JP] Japan ................................ 2-272434

[51] Int. Cl.$^6$ ...................... C08L 67/02; C08L 37/00
[52] U.S. Cl. ................... 427/386; 427/385.5; 525/133; 525/166; 525/176; 525/934
[58] Field of Search ............... 525/133, 166, 934; 427/385.5, 386

[56] References Cited

U.S. PATENT DOCUMENTS

| | | | |
|---|---|---|---|
| 3,857,905 | 12/1974 | Blackley | 525/166 |
| 4,499,239 | 2/1985 | Murakami | 525/166 |

FOREIGN PATENT DOCUMENTS

| | | |
|---|---|---|
| 2522614 | 12/1975 | Germany . |
| 49-47456 | 5/1974 | Japan . |
| 49-53239 | 5/1974 | Japan . |
| 50-151225 | 12/1975 | Japan . |
| 51-125109 | 11/1976 | Japan . |
| 56-136856 | 10/1981 | Japan . |
| 1391863 | 4/1975 | United Kingdom . |
| 2242196 | 9/1991 | United Kingdom . |

OTHER PUBLICATIONS

Chemical Abstracts, vol. 84, Abstract No. 123504 & JPA 50-151225.

*Primary Examiner*—Patricia A. Short
*Attorney, Agent, or Firm*—Burns, Doane, Swecker & Mathis

[57] ABSTRACT

There is disclosed a resin composition for powder coatings, which comprises a blend of two acrylic resins obtained by polymerizing a prescribed amount of monomer component (a-1) represented by formula (I) and a prescribed amount of another monomer component (a-2), respectively, and having different polymerization degrees represented by viscosities at 140° C. and a polybasic acid compound in 1.5 to 0.5 equivalent ratio of the glycidyl groups in said acrylic resins to the acid groups in the polybasic acid compound.

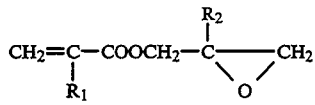

Formula (I)

wherein $R_1$ and $R_2$ each represent a hydrogen atom or a lower alkyl group. The resin composition for powder coatings that can form a coating film having a mat smooth appearance and being excellent in flexibility as shown by Du Pont impact resistance and the Ericksen test as well as being excellent in nail scratch resistance.

16 Claims, No Drawings

RESIN COMPOSITION FOR POWDER COATINGS

This application is a continuation of application Ser. No. 07/674,467, filed Mar. 25, 1991, now abandoned.

FIELD OF THE INVENTION

The present invention relates to a resin composition for powder coatings that, when applied, form a film whose 60° gloss is 60 or less (hereinafter referred to as mat surface), which film is excellent in smoothness and flexibility and which is free from a gloss change if it is scratched by a fingernail (which property is hereinafter referred to as nail scratch resistance).

BACKGROUND OF THE INVENTION

Resins for powder coatings that comprise a polyester resin having carboxyl groups and an acrylic resin having glycidyl groups in the molecule are reported in Japanese Patent Application (OPI) Nos. 47456/1974, 53239/1974, 125109/1976, and 136856/1981; the films formed from them are all highly glossy and have flexibility.

On one hand, the usage of powder coatings is expanding steadily and their application has become diversified due to their economy and performance, and on the other hand, the demanded performance is also diversified, and in view of the appearance of films, it is desired to develop a powder coating that gives a film having a smooth mat surface appearance and excellent flexibility and nail scratch resistance.

However, powder coatings comprising a polybasic acid compound, such as a polyester resin having carboxyl groups and an acrylic resin having glycidyl groups in the molecule, can exhibit desired flexibility only when the film is highly glossy as described above. Consequently, when the film is made mat, the film only becomes poor in smoothness and flexibility and it further has a defect that, when it is scratched by a fingernail, the film becomes glossy at the scratched part, which becomes conspicuous.

SUMMARY OF THE INVENTION

Therefore, the first object of the present invention is to provide a resin composition for powder coatings that, when applied, form a film that has a smooth mat surface appearance and that is excellent in flexibility and nail scratch resistance.

The second object of the present invention is to provide a mat powder coating that uses such a resin composition.

The third object of the present invention is to provide a coating method that can, by one application, form a film having a smooth mat appearance and that is excellent in flexibility, as shown in Du Pont impact resistance and the Ericksen test, as well as being excellent in nail scratch resistance.

Other and further objects, features, and advantages of the invention will appear more fully from the following description.

DETAILED DESCRIPTION OF THE INVENTION

Taking the above into consideration, the present inventors have intensively studied in order to provide a resin composition for powder coatings that gives a film that has a smooth mat surface appearance and that at the same time exhibits excellent flexibility and nail scratch resistance, and as a result they have found that a resin composition for powder coatings comprising a specific acrylic resin mixture and a specific polybasic acid compound attains the above objects, leading to the present invention.

That is, the present invention provides a resin composition for powder coatings, characterized in that:

(A) A resin comprising
  (a) 10 to 90 wt. % of an acrylic resin (A-1) having a viscosity of 100 to 800 poises at 140° C. that is a copolymer obtained by polymerizing 10 to 50 wt. % of a monomer component (a-1) represented by the formula (I):

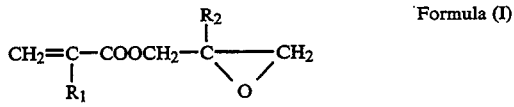

wherein $R_1$ and $R_2$ each represent a hydrogen atom or a lower alkyl group,
with 90 to 50 wt. % of another monomer component (a-2) comprising one or more monomers copolymerizable with said monomer component (a-1) and
  (b) 90 to 10 wt. % of an acrylic resin (A-2) having a viscosity of 1,000 to 5,000 poises at 140 ° C. that is a copolymer of obtained by polymerizing 10 to 50 wt. % of a monomer component (a-1) represented by formula (I) given above and 90 to 50 wt. % of other monomer component (a-2) made up of one or more monomers copolymerizable with said monomer component (a-1), and
(B) a polybasic acid compound having a viscosity of 100 to 2,000 poises at 140° C. are blended so that the equivalent ratio of the glycidyl groups in the acrylic resins (A-1 and A-2) to the acid groups in the polybasic acid compound (B) may be from 1.5 to 0.5.

Although the acrylic resin of the present invention comprises 10 to 90 wt. % of an acrylic resin (A-1) having a viscosity of 100 to 800 poises at 140° C. and 90 to 10 wt. % of an acrylic resin (A-2) having a viscosity of 1,000 to 5,000 poises at 140° C., preferably the present acrylic resin comprises 20 to 80 wt. % of the acrylic resin (A-1) and 80 to 20 wt. % of the acrylic resin (A-2). If the viscosity of the acrylic resin (A-1) at 140° C. (hereinafter the viscosity at 140° C. being referred to simply as the viscosity) is lower than 100 poises, the 60° gloss of the film exceeds 60 and the film does not become mat and the blocking resistance of the powder coating becomes poor. When the viscosity of the acrylic resin (A-1) exceeds 800 poises, a mat surface appearance can be secured but the flexibility and the nail scratch resistance decreases. When the proportion of the acrylic resin (A-1) is less than 10 wt. %, a mat surface appearance can be obtained but the flexibility decreases. On the other hand, when the proportion of the acrylic resin exceeds 90 wt. %, the flexibility and the nail scratch resistance are good but a mat surface appearance cannot be secured.

When the viscosity of the acrylic resin (A-2) is less than 1,000 poises, the film is apt to become glossy, while when the viscosity exceeds 5,000 poises, the film is made mat, but the flexibility and the nail scratch resistance decrease. When the proportion of the acrylic resin (A-2) is less than 10 wt. %, the film does not become mat, and when it exceeds 90 wt. % the flexibility and the nail scratch resistance become poor.

Further, the monomer component (a-1) in each of the acrylic resin (A-1) and the acrylic resin (A-2) is in an amount of 10 to 50 wt. %, preferably 10 to 40 wt. %, and more preferably 20 to 40 wt. %. If the amount is less than 10 wt. %, an adequate crosslinking effect cannot be secured, and if the amount exceeds 50 wt. % the smoothness of the film becomes poor. If the total amount of the monomer (a-1) in the acrylic resin (A-1) and the acrylic resin (A-2) is in the range of 10 to 50 wt. %, there is no problem. In the monomer component (a-1), the lower alkyl group represented by $R_1$ and $R_2$ includes methyl, ethyl, and propyl, and as the monomer component (a-1) glycidyl acrylate, glycidyl methacrylate, $\beta$-methylglycidyl acrylate, and $\beta$-glycidyl methacrylate are preferable, which may be used alone or as a mixture of two or more.

As the monomer component (a-2) copolymerizable with the monomer component (a-1), alkyl esters of acrylic acid or methacrylic acid such as methyl acrylate, ethyl acrylate, normal butyl acrylate, isobutyl acrylate, 2-ethylhexyl acrylate, cyclohexyl acrylate, methyl methacrylate, ethyl methacrylate, normal butyl methacrylate, isobutyl methacrylate, 2-ethylhexyl methacrylate, lauryl methacrylate, tridecyl methacrylate, stearyl methacrylate, and cyclohexyl methacrylate can be exemplified and, further, vinyl monomers such as styrene, vinyltoluene, $\alpha$-methylstyrene; acrylonitriles, for example, acrylonitrile and methacrylonitrile; acrylamides, for example, acrylamide and dimethylacrylamide; hydroxyalkyl esters of acrylic acid and methacrylic acid, for example, hydroxyethyl acrylate, hydroxypropyl acrylate, hydroxyethyl methacrylate, and hydroxypropyl methacrylate; and dialkyl esters of unsaturated dibasic acids can be mentioned, which may be used alone or as a mixture of two or more.

By using a mixture of the above-exemplified monomers (a-1) and (a-2) and an initiator, such as azobisisobutyronitrile and benzoyl peroxide, etc., a prescribed acrylic resin can be synthesized in accordance with a conventional polymerization process.

The viscosity of the acrylic resin used in the present invention mutually relates to the kind of monomer and the degree of the polymerization, and the degree of polymerization can be suitably controlled, for example, by the concentration of the initiator, the concentration of the polymerization solvent, the polymerization temperature, and the chain transfer agent.

In the present invention, use is made of a polybasic acid compound having a viscosity of 100 to 2,000 poises. When the viscosity is less than 100 poises, a glossy film is obtained and the blocking resistance of the coating lowers. When the viscosity exceeds 2,000 poises, the smoothness, flexibility, and nail scratch resistance lower. Herein the term "polybasic acid compounds" refers to compounds obtained by reacting a polybasic acid, such as a dicarboxylic acid, with a polyhydric alcohol, such as glycol.

Among polybasic acid compounds, compounds having carboxyl groups as acid groups are preferable, and such polyester resins can be easily synthesized by the polycondensation reaction under conditions where the acid groups of the carboxylic acid are present in excess of the hydroxyl groups or by the addition of an acid anhydride to the hydroxyl groups of a polyester polyol resin. Preferably the polybasic acid compound has a terminal carboxyl group and an acid value, generally, of 10 to 100, preferably of 10 to 50. In this case, the adjustment of the viscosity can be carried out in the same manner as that of the above acrylic resin. Preferably, the polybasic compound is one selected from the group of aromatic or aliphatic carboxylic acids and aromatic or aliphatic hydroxycarboxylic acids.

As aromatic carboxylic acid components for preparing such polyester resins, for example, polyvalent carboxylic acids such as terephthalic acid, isophthalic acid, phthalic acid, phthalic anhydride, naphthalenedicarboxylic acid, trimellitic acid, trimellitic anhydride, and pyromellitic acid and hydroxycarboxylic acids such as paraoxybenzoic acid can be mentioned. Besides aromatic carboxylic acids, aliphatic carboxylic acids can be used such as polyvalent carboxylic acids, for example, succinic acid, glutaric acid, adipic acid, pimelic acid, suberic acid, azelaic acid, sebacic acid, 1,9-nonanedicarboxylic acid, 1,10-decanedicarboxylic acid, eicosanedicarboxylic acid, maleic acid, maleic anhydride, fumaric acid, cyclohexanedicarboxylic acid, hexahydrophthalic acid, hexahydrophthalic anhydride, and 3,6-endomethylene-$\Delta^4$-tetrahydrophthalic anhydride and hydroxycarboxylic acids, for example, malic acid, tartaric acid, and 1,2-hydroxystearic acid.

As the alcohol component, for example, ethylene glycol, diethylene glycol, triethylene glycol, 1,2-propanediol, 1,3-propanediol, 1,3-butanediol, 1,4-butanediol, 1,5-pentanediol, 1,6-hexanediol, 1,9-nonanediol, 1,10-decanediol, neopentyl glycol, spiroglycol, 1,4-cyclohexanedimethanol, 2,2,4-trimethylpentane-1,3-diol, trimethylolethane, trimethylolpropane, glycerin, pentaerythritol, hydrogenated bisphenol A, and adducts of hydrogenated bisphenol A with ethylene oxide or propylene oxide can be used. As polyols, a polyhydric alcohol having 2 to 6 hydroxyl groups and adducts of bisphenol A or hydrogenated bisphenol A with alkylene oxides are preferable. Among the polyols, ethylene glycol and neopentyl glycol are more preferable.

In the preparation of a powder coating using said acrylic resin (A-1), acrylic resin (A-2), and polybasic acid, the equivalent ratio of the glycidyl group in the acrylic resins (A-1) and (A-2) to the acid group of the polybasic acid compound is preferably in the range of 1.5:0.5 to 0.5:1.5, more preferably 1.2:0.6 to 0.6:1.2.

Into the resin composition of the present invention for powder coatings comprising an acrylic resin (A-1), an acrylic resin (A-2), and a polybasic acid compound, if required, to make a coating formulation therefrom, for example, an epoxy resin for improving the corrosion resistance, benzoin for suppressing the occurrence of popping of the film, a catalyst for accelerating the curing reaction, a pigment, a leveling agent, an additive, such as an antistatic agent, auxiliaries, and resins may be blended in a range that would not injure the purpose of the present invention.

The mat powder coating resin composition of the present invention can be produced in accordance with a conventional method, for example by dryblending the above compounding ingredients using a Henschel mixer, and then melting and mixing them by a single-screw or twin-screw kneader or the like, followed by cooling, pulverizing, and classifying.

The viscosity at 140° C. referred in the present invention was measured by using a THER MOSEL and MODEL DV-II, manufactured by BROOKFIELD ENGINEERING LABORATORIES, INC.

The powder coating obtained can be easily used in electrostatic deposition by the common electrostatic coating method.

Now, the present invention will be described in more detail with reference to Examples and Comparative Examples, wherein all the parts quoted represent parts by weight.

PREPARATION EXAMPLE-1

Synthesis of an acrylic resin (A-1-1)

700 parts of xylene was charged into a reactor equipped with a stirrer and a reflux condenser, a mixture composed of monomers and an initiator as given below was added dropwise into the reactor over 4 hours while heating under reflux, and after the resulting mixture was kept for 1 hour under reflux, then the mixture was cooled, 5 parts of azobisisobutyronitrile was added, and the reaction was continued for 2 hours at 100° C. The obtained resin solution was heated to remove the xylene and the residual xylene was further removed under reduced pressure. The thus obtained acrylic resin (A-1-1) had a viscosity of 410 poises at 140° C. and an epoxy equivalent of 505.

| | |
|---|---|
| Styrene | 150 parts |
| Methyl methacrylate | 330 parts |
| n-Butyl methacrylate | 220 parts |
| Glycidyl methacrylate | 300 parts |
| Azobisisobutyronitrile | 40 parts |

PREPARATION EXAMPLE-2

Synthesis of an acrylic resin (A-1-2)

In the same way as in Preparation Example-1, a mixture composed of monomers and an initiator as given below was reacted to synthesize an acrylic resin (A-1-2). The obtained resin had a viscosity of 620 poises at 140° C. and an epoxy equivalent of 3,050.

| | |
|---|---|
| Styrene | 150 parts |
| Methyl methacrylate | 410 parts |
| n-Butyl methacrylate | 390 parts |
| Glycidyl methacrylate | 50 parts |
| Azobisisobutyronitrile | 40 parts |

PREPARATION EXAMPLE-3

Synthesis of an acrylic resin (A-1-3)

In the same way as in Preparation Example-1, a mixture composed of monomers and an initiator as given below was reacted to synthesize an acrylic resin (A-1-3). The obtained resin had a viscosity of 300 poises at 140° C. and an epoxy equivalent of 275.

| | |
|---|---|
| Styrene | 150 parts |
| Methyl methacrylate | 240 parts |
| n-Butyl methacrylate | 60 parts |
| Glycidyl methacrylate | 550 parts |
| Azobisisobutyronitrile | 40 parts |

PREPARATION EXAMPLE-4

Synthesis of an acrylic resin (A-1-4)

In the same way as in Preparation Example-1, a mixture composed of monomers and an initiator as given below was reacted to synthesize an acrylic resin (A-1-4). The obtained resin had a viscosity of 80 poises at 140° C. and an epoxy equivalent of 520.

| | |
|---|---|
| Styrene | 150 parts |
| Methyl methacrylate | 330 parts |
| n-Butyl methacrylate | 220 parts |
| Glycidyl methacrylate | 300 parts |
| Azobisisobutyronitrile | 40 parts |
| t-Butylperoxy-2-ethyl hexanoate | 40 parts |

PREPARATION EXAMPLE-5

Synthesis of an acrylic resin (A-1-5)

In the same way as in Preparation Example-1, a mixture composed of monomers and an initiator as given below was reacted to synthesize an acrylic resin (A-1-5). The obtained resin had a viscosity of 890 poises at 140° C. and an epoxy equivalent of 495.

| | |
|---|---|
| Styrene | 150 parts |
| Methyl methacrylate | 330 parts |
| n-Butyl methacrylate | 220 parts |
| Glycidyl methacrylate | 300 parts |
| Azobisisobutyronitrile | 32 parts |

PREPARATION EXAMPLE-6

Synthesis of an acrylic resin (A-2-1)

In the same way as in Preparation Example-1, a mixture composed of monomers and an initiator as given below was reacted to synthesize an acrylic resin (A-2-1). The obtained resin had a viscosity of 1,400 poises at 140° C. and an epoxy equivalent of 500.

| | |
|---|---|
| Styrene | 300 parts |
| Methyl methacrylate | 320 parts |
| n-Butyl methacrylate | 80 parts |
| Glycidyl methacrylate | 300 parts |
| Azobisisobutyronitrile | 30 parts |

PREPARATION EXAMPLE-7

Synthesis of an acrylic resin (A-2-2).

In the same way as in Preparation Example-1, a mixture composed of monomers and an initiator as given below was reacted to synthesize an acrylic resin (A-2-2). The obtained resin had a viscosity of 4,500 poises at 140° C. and an epoxy equivalent of 490.

| | |
|---|---|
| Styrene | 300 parts |
| Methyl methacrylate | 320 parts |
| n-Butyl methacrylate | 80 parts |
| Glycidyl methacrylate | 300 parts |
| Azobisisobutyronitrile | 20 parts |

PREPARATION EXAMPLE-8

Synthesis of an acrylic resin (A-2-3).

In the same way as in Preparation Example-1, a mixture composed of monomers and an initiator as given below was reacted to synthesize an acrylic resin (A-2-3). The obtained resin had a viscosity of 5,800 poises at 140° C. and an epoxy equivalent of 485.

| Styrene | 300 parts |
| --- | --- |
| Methyl methacrylate | 320 parts |
| n-Butyl methacrylate | 80 parts |
| Glycidyl methacrylate | 300 parts |
| Azobisisobutyronitrile | 15 parts |

PREPARATION EXAMPLE-9

Synthesis of a polyester resin-1

A mixture of raw materials with the composition given below was charged into a reactor, the esterification reaction was conducted at 250° C., a stoichiometric amount of water was removed from the system, and 0.3 part of antimony trioxide was added, and the reaction was continued for 5 hours at 270° C. with the pressure controlled to 20 mm Hg. The obtained polyester resin 1 had an acid value of 46 and a viscosity of 480 poises at 140° C.

| Terephthalic acid | 648 parts |
| --- | --- |
| Isophthalic acid | 137 parts |
| Ethylene glycol | 87 parts |
| Neopentyl glycol | 297 parts |

PREPARATION EXAMPLE-10

Synthesis of a polyester resin-2

A mixture of raw materials having the composition shown below was charged into a reactor and the esterification reaction was conducted in the same way as in Preparation Example-9. The obtained polyester resin-2 had an acid value of 38 and a viscosity of 1,800 poises at 140° C.

| Terephthalic acid | 635 parts |
| --- | --- |
| Isophthalic acid | 134 parts |
| Ethylene glycol | 87 parts |
| Neopentyl glycol | 297 parts |

PREPARATION EXAMPLE-11

Synthesis of a polyester resin-3

A mixture of raw materials having the composition shown below was charged into a reactor and the esterification reaction was conducted in the same way as in Preparation Example-9. The obtained polyester resin-3 had an acid value of 78 and a viscosity of 40 poises at 140° C.

| Terephthalic acid | 635 parts |
| --- | --- |
| Isophthalic acid | 200 parts |
| Ethylene glycol | 87 parts |
| Neopentyl glycol | 297 parts |

PREPARATION EXAMPLE-12

Synthesis of a polyester resin-4

A mixture of raw materials having the composition shown below was charged into a reactor and the esterification reaction was conducted in the same way as in Preparation Example-9. The obtained polyester resin-4 had an acid value of 30 and a viscosity of 3,500 poises at 140° C.

| Terephthalic acid | 622 parts |
| --- | --- |
| Isophthalic acid | 131 parts |
| Ethylene glycol | 87 parts |
| Neopentyl glycol | 297 parts |

EXAMPLES 1 TO 7 AND COMPARATIVE EXAMPLE 1 TO 9

Blending was made as shown in Table 1 so that the glycidyl group in the acrylic resins synthesized in Preparation Examples 1-8 and the carboxyl group in the polyester resins synthesized in Preparation Examples 9-12 have the indicated equivalent ratio, further pigments and a leveling agent were added, each mixture was melted and kneaded at 110° C. using a twin-screw kneader, and after cooling and pulverizing each mixture, each mixture was ground and classified to obtain respective powder coatings.

Each powder coating was applied to a steel plate treated with zinc phosphate having a thickness of 0.8 mm by electrostatic coating so that the film thickness would be about 70 μm and then the film was baked at 200° C. for 20 min.

The performance of the obtained films is shown in Table 2.

TABLE 1

| | This Invention | | | | | | | Comparative Example | | | | | | | | |
| --- | --- | --- | --- | --- | --- | --- | --- | --- | --- | --- | --- | --- | --- | --- | --- | --- |
| | 1 | 2 | 3 | 4 | 5 | 6 | 7 | 1 | 2 | 3 | 4 | 5 | 6 | 7 | 8 | 9 |
| Acrylic resin (A-1-1) | 3.0 | 14.6 | 26.3 | 12.7 | 2.6 | 12.6 | 22.8 | 29.3 | — | — | — | — | — | 14.4 | 20.6 | 10.6 |
| Acrylic resin (A-1-2) | — | — | — | — | — | — | — | — | — | 62.6 | — | — | — | — | — | — |
| Acrylic resin (A-1-3) | — | — | — | — | — | — | — | — | — | — | 17.6 | — | — | — | — | — |
| Acrylic resin (A-1-4) | — | — | — | — | — | — | — | — | — | — | — | 14.7 | — | — | — | — |
| Acrylic resin (A-1-5) | — | — | — | — | — | — | — | — | — | — | — | — | 14.5 | — | — | — |
| Acrylic resin (A-2-1) | 26.1 | 14.6 | 3.0 | 12.7 | — | — | — | — | 29.1 | 7.0 | 2.0 | 14.7 | 14.5 | — | 20.6 | 10.6 |
| Acrylic resin (A-2-2) | — | — | — | — | 22.4 | 12.6 | 2.6 | — | — | — | — | — | — | — | — | — |
| Acrylic resin (A-2-3) | — | — | — | — | — | — | — | — | — | — | — | — | — | 14.4 | — | — |
| Polyester resin-1 | 70.9 | 70.8 | 70.7 | — | — | — | — | 70.7 | 70.9 | 30.4 | 80.4 | 70.6 | 71.0 | 71.2 | — | — |
| Polyester resin-2 | — | — | — | 74.6 | 75.0 | 74.8 | 74.6 | — | — | — | — | — | — | — | — | — |
| Polyester resin-3 | — | — | — | — | — | — | — | — | — | — | — | — | — | — | 58.8 | — |
| Polyester resin-4 | — | — | — | — | — | — | — | — | — | — | — | — | — | — | — | 78.8 |
| Barium sulfate | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |
| Carbon black | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| Resimix RL-4* | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |

Note: *Resimix RL-4: Leveling agent, manufactured by Mitsui Toatsu Chem. Co.

TABLE 2

| | This Invention | | | | | | | Comparative Example | | | | | | | | | |
|---|---|---|---|---|---|---|---|---|---|---|---|---|---|---|---|---|---|
| | 1 | 2 | 3 | 4 | 5 | 6 | 7 | 1 | 2 | 3 | 4 | 5 | 6 | 7 | 8 | 9 |
| Gloss (60°) | 3 | 15 | 40 | 30 | 2 | 10 | 25 | 83 | 1 | 45 | 43 | 90 | 2 | 1 | 92 | 1 |
| Smoothness | ○ | ○ | ○ | ○ | ○ | ○ | ○ | ○ | X | ○ | X | ○ | X | X | ○ | X |
| Du pont Impact Test (cm) | 40 | 45 | 45 | 45 | 40 | 40 | 45 | 50 | 5 | 10 | 50 | 40 | 40 | 5 | 50 | 5 |
| Ericksen (mm) | 6.0 | 6.5 | 7< | 7< | 6 | 6.2 | 6.7 | 7< | 1> | 3.2 | 7< | 6.5 | 5.8 | 1> | 7< | 1> |
| Nail Scratch Resistance | ○ | ○ | ○ | ○ | ○ | ○ | ○ | ○ | X | ○ | X | ○ | X | X | ○ | X |

Note:
Gloss: 60° Gloss measured by a gloss meter
Smoothness: Visual evaluation . . . ○: smooth, X: orange peel or the like
DuPont Impact Test: Measured by a DuPont impact tester, ½ inch × 500 g weight
Ericksen: Measured by an Ericksen tester
Nail Scratch Resistance: Visual evaluation of part scratched by fingernail
○: Not changed in gloss
X: Changed to be glossy, nail scratch is remarkably conspicuous.

As is apparent from the results in Table 2, it can be noticed that a film that has a smooth mat surface appearance and that is excellent in flexibility and nail scratch resistance can be obtained according to the present invention.

Having described our invention as related to the present embodiments, it is our intention that the invention not be limited by any of the details of the description, unless otherwise specified, but rather be construed broadly within its spirit and scope as set out in the accompanying claims.

What we claim is:

1. A resin composition for powder coatings, which comprises,
    (A) a resin comprising (a) 10 to 90 wt. % of an acrylic resin (A-1) having a viscosity of 100 to 800 poises at 140° C. that is a copolymer obtained by polymerizing 10 to 50 wt. % of a monomer component (a-1) represented by the formula (I):

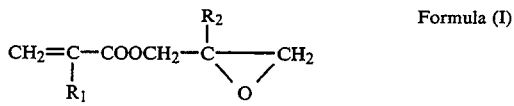

Formula (I)

wherein $R_1$ and $R_2$ each represent a hydrogen atom or a lower alkyl group, with 90 to 50 wt. % of another monomer component (a-2) comprising one or more monomers copolymerizable with said monomer component (a-1) and
    (b) 90 to 10 wt. % of an acrylic resin (A-2) having a viscosity of 1,000 to 5,000 poises at 140° C. that is a copolymer obtained by polymerizing 10 to 50 wt. % of a monomer component (a-1) represented by the formula (I) given above and 90 to 50 wt. % of monomer component (a-2) comprising one or more monomers copolymerizable with said monomer component (a-1) and
    (B) a polybasic acid compound obtained by reacting a polybasic acid and a polyhydric alcohol and having a viscosity of 100 to 2,000 poises at 140° C. wherein the resin and polybasic acid compound are blended to that the equivalent ratio of the glycidyl groups in the acrylic resins (A-1 and A-2) to the acid groups in the polybasic acid compound (B) is from 1.5 to 0.5 and wherein said resin composition forms a film having a 60° gloss of 60 or less.

2. The resin composition for powder coatings as claimed in claim 1, wherein the resin comprises 20 to 80 wt. % of the acrylic resin (A-1) and 80 to 20 wt. % of the acrylic resin (A-2), of total weight of acrylic resins.

3. The resin composition for powder coatings as claimed in claim 1, wherein the acrylic resin (A-1) contains 10 to 40 wt. % of the monomer component (a-1).

4. The resin composition for powder coatings as claimed in claim 1, wherein the acrylic resin (A-1) contains 20 to 40 wt. % of the monomer component (a-1).

5. The resin composition for powder coatings as claimed in claim 1, wherein the acrylic resin (A-2) contains 10 to 40 wt. % of the monomer component (a-1).

6. The resin composition for powder coatings as claimed in claim 1, wherein the acrylic resin (A-(A-2) contains 20 to 40 wt. % of the monomer component (a-1).

7. The resin composition for powder coatings as claimed in claim 1, wherein the monomer component (a-1) represented by formula (I) is one or more selected from the group consisting of glycidyl acrylate, glycidyl methacrylate, β-methylglycidyl acrylate, and β-methyl-glycidyl methacrylate.

8. The resin composition for powder coatings as claimed in claim 1, wherein the monomer component (a-1) represented by formula (I) is glycidyl methacrylate.

9. The resin composition for powder coatings as claimed in claim 1, wherein the monomer component (a-2) is one or more selected from the group consisting of acrylic acid, methacrylic acid, alkyl esters of acrylic acid and methacrylic acid, hydroxyalkyl esters, cyclohexyl esters, vinyl series monomers, acrylonitriles, methacrylonitriles, acrylamides and methacrylamides.

10. The resin composition for powder coatings as claimed in claim 1, wherein the monomer component (a-2) is one or more selected from the group consisting of methyl methacrylate, n-butyl methacrylate, and styrene.

11. The resin composition for powder coatings as claimed in claim 1, wherein the polybasic acid compound (B) is a polyester resin which is obtained from the reaction of an excess of one or more carboxylic acids selected from the group consisting of aromatic or aliphatic carboxylic acids and aromatic or aliphatic hydroxycarboxylic acids with polyols and which has a carboxyl group as a terminal group.

12. The resin composition for powder coatings as claimed in claim 11, wherein the carboxylic acid is terephthalic acid or isophthalic acid.

13. The resin composition for powder coatings as claimed in claim 11, wherein the polyol is a polyalcohol having 2 to 6 hydroxyl groups, bisphenol A, or alkyleneoxide adduct of hydrogenated bisphenol A.

14. The resin composition for powder coatings as claimed in claim 11, wherein the polyol is ethylene glycol or neopentyl glycol.

15. The resin composition for powder coatings as claimed in claim 1, wherein the equivalent ration of the glycidyl groups in the acrylic resins (A) to the acid groups in the polybasic compound (B) is 1.2 to 0.6.

16. A method for powder coating a material to be coated, which comprises coating the material with a resin composition for powder coatings comprising, (A) a resin comprising (a) 10 to 90 wt. % of an acrylic resin (A-1) having a viscosity of 100 to 800 poises at 140° C. that is a copolymer obtained by polymerizing 10 to 50 wt. % of a monomer component (a-1) represented by the formula (I):

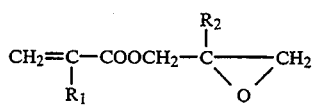

Formula (I)

wherein $R_1$ and $R_2$ each represent a hydrogen atom or a lower alkyl group, with 90 to 50 wt. % of another monomer component (a-2) comprising one or more monomers copolymerizable with said monomer component (a-1) and (b) 90 to 10 wt. % of an acrylic resin (A-2) having a viscosity of 1,000 to 5,000 poises at 140° C. that is a copolymer obtained by polymerizing 10 to 50 wt. % of a monomer component (a-1) represented by the formula (I) given above and 90 to 50 wt. % of other monomer component (a-2) comprising one or more monomers copolymerizable with said monomer component (a-1) and (B) a polybasic acid compound obtained by reacting a polybasic acid and a polyhydric alcohol and having a viscosity of 100 to 2,000 poises at 140° C. wherein the resin and polybasic acid compound are blended so that the equivalent ratio of the glycidyl groups in the acrylic resins (A-1 and A-2) to the acid groups in the polybasic acid compound (B) is from 1.5 to 0.5 and wherein the coating has a 60° gloss of 60 or less.

* * * * *

UNITED STATES PATENT AND TRADEMARK OFFICE
CERTIFICATE OF CORRECTION

PATENT NO. : 5,407,706

DATED : April 18, 1995

INVENTOR(S) : Taisaku KANO et al

It is certified that error appears in the above-indentified patent and that said Letters Patent is hereby corrected as shown below:

On the title page item

[57] In the Abstract, line 18, delete "Du Pont" and insert therefor -- DuPont --.

Col. 9,
In claim 1, line 60, delete "to" and insert therefor -- so --.

Col. 10,
In claim 6, line 29, delete "(A-(A-2)" and insert therefor
 -- (A-2) --.

Col. 11,
In claim 15, line 5, delete "ration" and insert therefor
 -- ratio --.

Signed and Sealed this

Thirty-first Day of October 1995

Attest:

BRUCE LEHMAN

Attesting Officer     Commissioner of Patents and Trademarks